Aug. 20, 1957    W. HOLT    2,803,285
TUBELESS TIRE RIM ASSEMBLY
Filed April 19, 1955

INVENTOR.
WILLIAM HOLT
BY
ATTORNEY

United States Patent Office 2,803,285
Patented Aug. 20, 1957

2,803,285

TUBELESS TIRE RIM ASSEMBLY

William Holt, Kearny, N. J., assignor of one-half to Andrew F. Stainer, Passaic, N. J.

Application April 19, 1955, Serial No. 502,331

5 Claims. (Cl. 152—410)

This invention relates to rims for supporting vehicle tires and more specifically for rims upon which tubeless tires are to be mounted. Where tubeless tires are applied to the rims of vehicles as, for example, the presently known drop center rims, difficulties arise particularly in the case of larger sized tires such as are used on trucks and the like. These tires are difficult to place on the rim and when so installed are difficult to inflate since the amount of air rushing into the casing of the tire is not sufficient to force the tire against the rim in order to permit inflation. Moreover, the stiffness of the larger tires makes it difficult to slip them upon the conventional rim without damaging the beads of the tire casing which requires an intimate contact with the rim for the purpose of sealing the air within the tire.

Accordingly, it is an object of the present invention to provide a tire rim which will permit a tire to be mounted thereon with a minimum of difficulty.

Another object of the present invention is to provide a tire rim which will aid the inflation of the tubeless tire placed thereon.

Another object of the present invention is to provide a tire rim which may be assembled with a minimum amount of difficulty and without specialized tools.

A further object of the present invention is to provide a simplified tire rim having a minimum number of parts.

A feature of the present invention is its continuous ring-like rubber gasket which aids in the original inflation of the tire and in the maintainance of the seal between the tire and the rim.

Another feature of the present invention is its slip-ring construction which moves laterally across the rim as the tire is inflated.

A further feature of the present invention is its snap-ring like, lock-ring construction which secures the entire assembly to the rim.

The invention consists of the construction, combination and arrangement of parts, as herein illustrated, described and claimed.

In the accompanying drawing, forming a part hereof is illustrated one form of embodiment of the invention, and in which.

Figure 1:
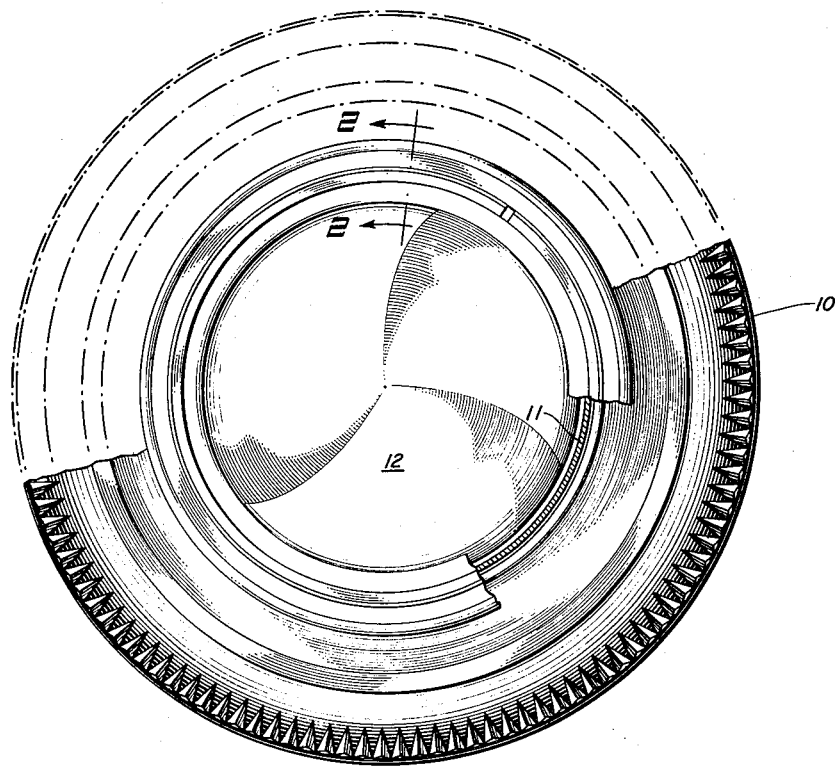
Figure 1 is a view in side elevation of a complete embodiment of the present invention with certain parts broken away to show the interior construction thereof.

Referring to the drawing, 10 indicates a tubeless tire mounted upon the rim 11 of a wheel 12. One edge of the rim 11 is provided with an upwardly turned flange member 13 which is adapted to retain the bead 14 of the tire 10 upon the bead seat 15 of the rim 11. The opposite or outer side of the rim 11 is thickened as by welding thereon, a guide ring 17 at the place usually occupied by a second flange 13. The guide ring 17 is grooved as indicated at 18 and cut away along its inner edge to form an arcuate seat 19. The upper face 20 of the ring 17 is stepped as indicated at 21.

A slip-ring 22 is slidably received upon the stepped surface 21 of the guide ring 17. The inner surface 23 of the slip-ring 22 is of a shape which generally conforms to that of the tire 10, when inflated. The inner lower edge of the slip-ring 22 is cut away to form an arcuate seat 24 which continues the curve of the arcuate seat 19 cut into the inner edge of the guide ring 17. The combined arcuate seats 19, 24, form a semi-circular socket into which is received a resilient sealing gasket member 25.

The sealing member 25 is circular in cross-section and one-half of said gasket member 25 rests within the socket while the remainder of the gasket projects towards the center of the rim 11. The sealing member 25 fits tightly upon the portion of the rim adjacent the guide ring 17.

A split locking ring 26 completes the tire rim mounting assembly and holds all of the elements in place during use. The locking ring 26 snaps within the groove 18 in the guide ring 17 and extends outwardly from the stepped face 21 of the guide ring a distance sufficient to bear against the side of the slip-ring 22. The slip-ring 22 may be recessed as indicated at 27 for the purpose of forming a bearing surface to receive the locking ring 26. When it is desired to place a tire upon the rim it is merely necessary to slip the tire over the rim from the slip-ring side of the wheel. Thereafter, the sealing gasket member 25 is slipped over the slip ring 22 and rim and pushed into a contact with the bead of the tire 10. The slip ring 22 is next slid over the guide ring 17 and the locking ring 26 is snapped into the groove 18 in the guide ring 17. When air is forced into the tire 10, the sealing gasket member 25 forms a seal between the bead of the tire and the rim 11 so that the tire may be inflated. As the tire is inflated the sealing gasket 25 is forced outwardly by the bead of the tire until it comes to rest within the socket formed by the cut away portions 19, 24, of the guide ring 17 and the slip ring 22. Thereafter the sealing gasket 25 prevents air from escaping from the tire along the meeting edges of the guide ring 17 and sealing gasket 25. The inflated tire 10 further holds the slip ring 22 firmly against the locking ring 26 so that the entire rim becomes in effect a unitary structure.

Figure 2:
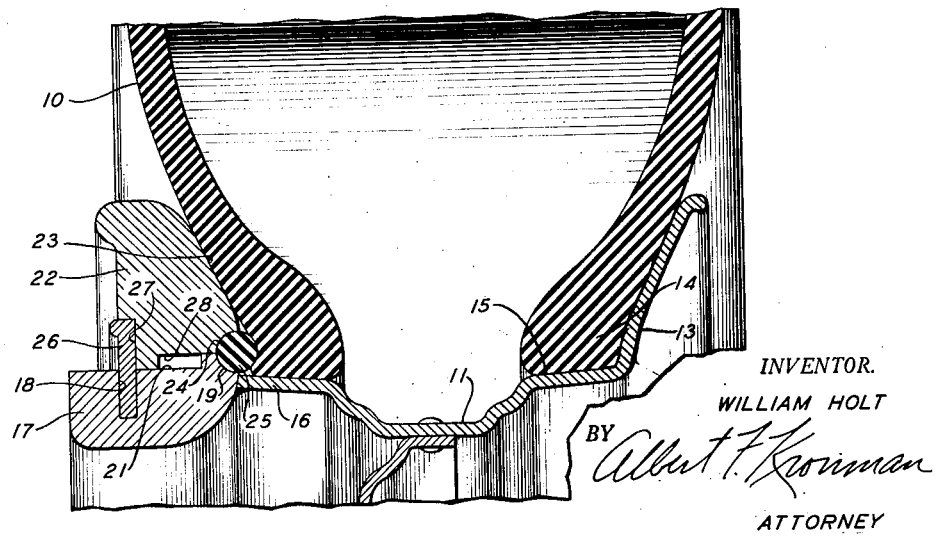
Figure 2 is a vertical section taken on line 2—2 in Figure 1, somewhat enlarged showing the rim and tire assembly in accordance with the present invention.

While the upper surface of the guide ring 17 has been indicated as stepped it is within the purview of the present invention to make this surface substantially plane and to make the inside diameter of the slip ring 22 in conformity with the upper surface of the guide ring 17. It will be understood that the stepped construction of the ring 17 and ring 22 shown in Figure 2 prevents the slip ring 22 from sliding too far toward the center of the rim 11. However, with the sealing gasket 25 in place and of a sufficient diameter to grasp the rim tightly it has been found that the inward travel of the slip ring is limited by coming in contact with the sealing gasket 25.

When it is desired to remove a tire from the rim it is merely necessary to deflate the tire and push the slip ring 22 inwardly until the locking ring 26 can be snapped out of its groove 18 in the guide ring 17. Thereafter, the slip ring 22 may be pulled from the rim and the sealing gasket member 25 also removed from its position upon the rim structure. The tire 10 can then be slipped off the remaining support of the rim with ease since the guide ring 17 presents no obstacle to the outward travel of the tire 10. From the foregoing it will be seen that there has been described a tire rim for mounting tubeles tires which is extremely simple to operate and will facilitate the mounting of tires upon a wheel.

I claim:

1. A tubeless tire and rim asssembly comprising, a tire receiving rim member, a tubeless tire on said rim member an upwardly turned flange on one edge of said rim, a guide ring secured to the opposite side of said rim, a continuous groove in said guide ring extending from the outer surface of the ring toward the inside surface of the ring, said guide ring having an arcuate annular seat upon its inner edge, a slip ring overlying the guide ring, an arcuate annular seat on the inner edge of the slip ring adjacent the guide ring, a sealing gasket receivable upon the slip ring and guide ring seats and in contact with the tire, and a split locking ring receivable within the guide ring groove and in contact with the slip ring to retain the said slip ring upon the guide ring.

2. A tubeless tire and rim assembly comprising, a tire receiving rim member, a tubeless tire on said rim member an upwardly turned flange on one edge of said rim, a guide ring secured to the opposite side of said rim, a continuous grove in said guide ring extending from the outer surface of the ring toward the inside surface of the ring, said guide ring having an arcuate annular seat upon its inner edge, a slip ring overlying the guide ring, an arcuate annular seat on the inner edge of the slip ring adjacent the guide ring, a sealing gasket having a substantially circular cross section receivable upon the slip ring and guide ring seats and in contact with the tire, and a split locking ring receivable within the guide ring groove and in contact with the slip ring to retain the said slip ring upon the guide ring.

3. A tubeless tire and rim assembly comprising, a tire receiving rim member, a tubeless tire on said rim member an upwardly turned flange on one edge of said rim, a guide ring having a stepped outer surface secured to the opposite side of said rim, a continuous groove in said guide ring extending from the outer surface of the ring toward the inside surface of the ring, said guide ring having an arcuate annular seat upon its inner edge, a slip ring having a stepped inner surface overlying the guide ring, an arcuate annular seat on the inner edge of the slip ring adjacent the guide ring, a sealing gasket receivable upon the slip ring and guide ring seats and in contact with the tire, and a split locking ring receivable within the guide ring groove and in contact with the slip ring to retain the said slip ring upn the guide ring.

4. A tubeless tire and rim assembly comprising, a tire receiving rim member, a tubeless tire on said rim member an upwardly turned flange on one edge of said rim, a guide ring having a stepped outer surface secured to the opposite side of said rim, a continuous groove in said guide ring extending from the outer surface of the ring toward the inside surface of the ring, said guide ring having an arcuate annular seat upon its inner edge, a slip ring having a stepped inner surface overlying the guide ring, an arcuate annular seat on the inner edge of the slip ring adjacent the guide ring, a sealing gasket having a substantially circular cross section receivable upon the slip ring and guide ring seats and in contact with the tire, and a split locking ring receivable within the guide ring groove and in contact with the slip ring to retain the said slip ring upon the guide ring.

5. A tubeless tire and rim assembly comprising, a tire receiving rim member, a tubeless tire on said rim member an upwardly turned flange on one edge of said rim, a guide ring secured to the opposite side of said rim, a continuous groove in said guide ring extending from the outer surface of the ring toward the inside surface of the ring, said guide ring having an arcuate annular seat upon its inner edge, a slip ring overlying the guide ring, an annular recess in the side of the slip ring opposite the tire, an arcuate annular seat on the inner edge of the slip ring adjacent the guide ring, a sealing gasket having a substantially circular cross section receivable upon the slip ring and guide ring seats and in contact with the tire, and a split locking ring receivable within the guide ring groove and in contact with the recess in the slip ring to retain the said slip ring upon the guide ring.

References Cited in the file of this patent

UNITED STATES PATENTS

| | | |
|---|---|---|
| 2,685,907 | Waddell | Aug. 10, 1954 |
| 2,709,472 | Hofweber | May 31, 1955 |

FOREIGN PATENTS

| | | |
|---|---|---|
| 1,080,891 | France | June 2, 1954 |

(Corresponding Great Britain 725,767 Mar. 9, 1955)